(12) United States Patent
Alvarez

(10) Patent No.: US 8,389,077 B2
(45) Date of Patent: *Mar. 5, 2013

(54) WINDOW FOR PREVENTING BIRD COLLISIONS

(75) Inventor: Jemssy Alvarez, Gregory, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,813

(22) Filed: Jan. 23, 2012

(65) Prior Publication Data

US 2012/0121829 A1 May 17, 2012

Related U.S. Application Data

(63) Continuation of application No. 11/984,444, filed on Nov. 16, 2007, now Pat. No. 8,114,488.

(51) Int. Cl.
*E06B 3/00* (2006.01)
*E04C 2/54* (2006.01)
*F21V 9/06* (2006.01)

(52) U.S. Cl. .......... 428/34; 428/432; 428/701; 428/702; 359/361; 52/786.1; 52/786.13

(58) Field of Classification Search .............. 428/34, 428/432, 701, 702; 359/361, 589; 52/786.1, 52/786.13

See application file for complete search history.

(56) References Cited

U.S. PATENT DOCUMENTS

| | | |
|---|---|---|
| 3,591,248 A | 7/1971 | Meunier et al. |
| 5,214,008 A | 5/1993 | Beckwith et al. |
| 5,332,618 A | 7/1994 | Austin |
| 6,303,225 B1 | 10/2001 | Veerasamy |
| 6,573,207 B2 | 6/2003 | Landa et al. |
| 6,632,491 B1 | 10/2003 | Thomsen et al. |
| 6,949,484 B2 | 9/2005 | Landa et al. |
| 7,037,869 B2 | 5/2006 | Landa et al. |
| 7,151,065 B2 | 12/2006 | Thomsen et al. |
| 7,169,722 B2 | 1/2007 | Landa et al. |
| 8,114,488 B2 | 2/2012 | Alvarez |
| 2002/0192371 A1 | 12/2002 | Veerasamy et al. |
| 2004/0258926 A1 | 12/2004 | Veerasamy |
| 2006/0057294 A1 | 3/2006 | Veerasamy et al. |
| 2006/0083853 A1 | 4/2006 | Petrmichl et al. |
| 2006/0165996 A1 | 7/2006 | Veerasamy et al. |
| 2007/0003699 A1 | 1/2007 | Hosokawa et al. |
| 2007/0042186 A1 | 2/2007 | Veerasamy |

OTHER PUBLICATIONS

U.S. Appl. No. 11/984,444, filed Nov. 16, 2007; Alvarez.

*Primary Examiner* — Donald J Loney
(74) *Attorney, Agent, or Firm* — Nixon & Vanderhye P.C.

(57) ABSTRACT

This invention relates to a window designed to prevent or reduce bird collisions therewith. In certain example embodiments, the window may include an insulating glass (IG) window unit having first and second substrates spaced apart from one another, wherein at least one of the substrates supports an ultraviolet (UV) reflecting coating for reflecting UV radiation so that birds are capable of more easily seeing the window. By making the window more visible to birds, bird collisions and thus bird deaths can be reduced.

8 Claims, 2 Drawing Sheets

WINDOW FOR PREVENTING BIRD COLLISIONS

This application is a continuation of application Ser. No. 11/984,444, filed Nov. 16, 2007, now U.S. Pat. No. 8,114,488 the entire disclosure of which is hereby incorporated herein by reference in this application.

This invention relates to a window designed to prevent or reduce bird collisions therewith. In certain example embodiments, the window may comprise an insulating glass (IG) window unit, or alternatively a monolithic window. In IG window unit embodiments, the IG window unit includes first and second substrates (e.g., glass substrates) spaced apart from one another, wherein at least one of the substrates supports an ultraviolet (UV) reflecting coating for reflecting UV radiation so that birds are capable of more easily seeing the window. By making the window more visible to birds, bird collisions and bird deaths can be reduced.

BACKGROUND OF THE INVENTION

IG window units are known in the art. For example, see U.S. Pat. Nos. 6,632,491; 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances.

Many conventional IG window units include a solar management coating (e.g., multi-layer coating for reflecting at least some infrared radiation) on an interior surface of one of the two substrates. Such IG units enable significant amounts of infrared (IR) radiation to be blocked so that it does not reach the interior of the building (apartment, house, office building, or the like).

Unfortunately, bird collisions with such windows represent a significant problem. For instance, in Chicago certain buildings (e.g., skyscrapers) are located in migratory bird paths. Birds flying along these paths repeatedly run into these buildings because they cannot see the windows of the building. This results in thousands of bird deaths, especially during seasons of bird migration.

Conventional ways of reducing bird collisions with windows include the use of nets, decals, or frit. However, these solutions are considered ineffective because of the aesthetic impact on the architecture and/or because they do not work as they do not make the glass more visible to birds.

In view of the above, it will be appreciated that there exists a need in the art for improved windows which can prevent or reduce bird collisions therewith.

BRIEF SUMMARY OF THE INVENTION

In certain example embodiments of this invention, a window is designed to prevent or reduce bird collisions therewith. In certain example embodiments, the window may comprise an insulating glass (IG) window unit, or alternatively a monolithic window. In IG window unit embodiments, the IG window unit includes first and second substrates (e.g., glass substrates) spaced apart from one another, wherein at least one of the substrates supports ultraviolet (UV) reflecting coating for reflecting UV radiation so that bird are capable of more easily seeing the window. By making the window more visible to birds in such a manner, bird collisions and thus bird deaths can be reduced.

In certain example embodiments, there is provided a window unit (monolithic or IG type) comprising: a glass substrate; a UV reflecting coating provided on the glass substrate; wherein the UV reflecting coating consists essentially of an oxide and/or nitride of one or more of titanium, vanadium, chromium, zirconium, niobium, tantalum, and tungsten, and wherein the UV reflecting coating is not part of a low-E coating; and wherein the window has a visible transmission of at least about 50%, and the UV reflecting coating reflects at least 20% of UV radiation in the range of from 350-450 nm.

In other example embodiments, there is provided an insulating glass (IG) window unit comprising: a first glass substrate; a second glass substrate spaced apart from the first glass substrate; a UV reflecting coating provided on an exterior surface of the IG window unit so as to face an exterior of a building in which the IG window unit is to be mounted; wherein the UV reflecting coating consists essentially of titanium oxide, and is not part of a low-E coating; and wherein the IG window unit has a visible transmission of at least about 50%, and the UV reflecting coating reflects at least 20% of UV radiation in the range of from 350-450 nm.

DETAILED DESCRIPTION OF EXAMPLE EMBODIMENTS OF THE INVENTION

Figure 1:
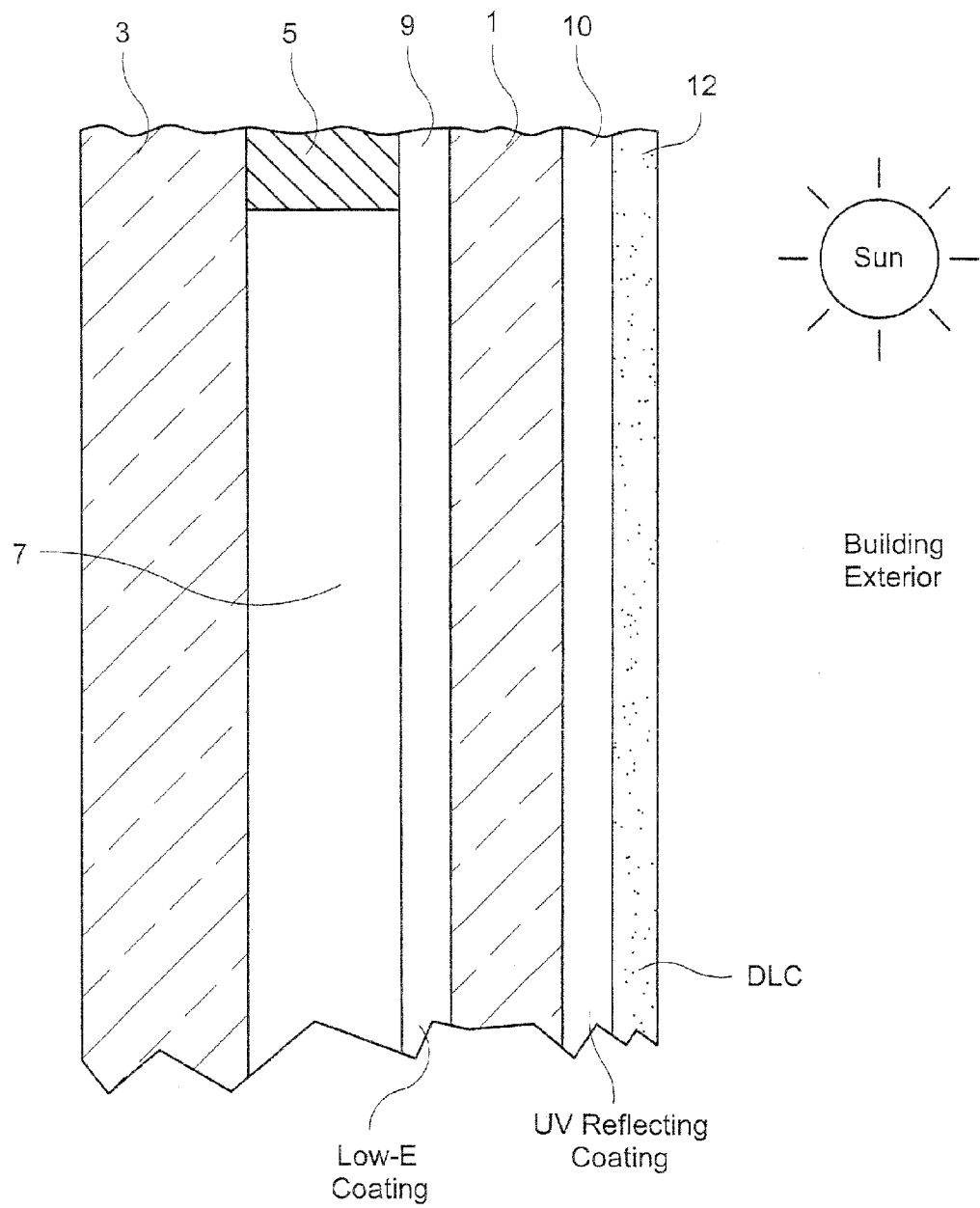
FIG. 1 is a cross sectional view of an IG window unit according to an example embodiment of this invention.

Referring now more particularly to the accompanying drawings in which like reference numerals indicate like parts throughout the several views.

A window is designed to prevent or reduce bird collisions therewith. In certain example embodiments, the window may comprise an insulating glass (IG) window unit, or alternatively a monolithic window. In IG window unit embodiments, the IG window unit includes first and second substrates (e.g., glass substrates) spaced apart from one another, wherein at least one of the substrates supports ultraviolet (UV) reflecting coating for reflecting UV radiation so that bird are capable of more easily seeing the window. By making the window more visible to birds in such a manner, bird collisions and thus bird deaths can be reduced. In IG window unit embodiments, first and second spaced apart substrates are separated from one another by at least one seal and/or spacer. In certain example embodiments, the first substrate supports a solar management coating for blocking at least some infrared (IR) radiation and a UV reflecting blocking coating for reflecting UV radiation to make the window more visible to birds in order to reduce collisions. In certain example embodiments, the solar management coating may have an emissivity ($E_n$) of no greater than 0.10 and/or a sheet resistance ($R_s$) of no greater than 8 ohms/square. In certain example embodiments, the UV reflecting coating may block at least 15% (more preferably at least 20%, even more preferably at least 25%, and possibly at least 30%) of UV radiation in at least a substantial part of the range from 350 to 440 nm (or alternatively in a substantial part of the range from 300-400 nm).

Research has indicated that birds can see in the near UV range. In certain example embodiments of this invention, a glass coating is provided which includes or is of single, multiple, or intermixed layers of titanium, vanadium, chromium, zirconium, niobium, tantalum, or tungsten combined with oxygen and/or nitrogen in order to form element variations or compounds that achieve a refractive index (n) of at least about 2.5. This increases the UV reflection of the plate glass intended for commercial, residential, and/or interior applications in order to make such windows more visible to birds thereby preventing or reducing bird collisions. The use of such coatings herein enhances the performance of the glass or window by increasing the UV reflectance beyond the normal limits of raw uncoated plate glass in the 300-440 nm range of the spectrum. In certain example embodiments, the high index UV reflecting coating may be capped or covered with a protective coating of a material such as diamond-like carbon (DLC) or the like in order to improve the durability of the window.

Typical raw float glass reflects about 5% of UV light in the 350-440 nm range. By coating UV reflective materials such as titanium oxide (e.g., $TiO_2$ or any other suitable stoichiometry) and the like on the glass, the UV reflectance can be increased without adversely affecting the aesthetics of the glass or window. Samples which have been made (e.g., see FIG. 2) show that as much as about 48% of UV reflection can be achieved using a thin coating of titanium oxide directly on the glass, thereby making the glass or window much more visible to birds in order to reduce collisions. By adjusting the thickness of the material and/or by using combinations of titanium, vanadium, chromium, zirconium, niobium, tantalum and/or tungsten (including oxides and/or nitrides thereof), the UV reflecting coating can be optimized to maximize total reflectivity across the 300-440 nm range.

FIG. 1 is a cross sectional view of a portion of an IG window unit according to an example embodiment of this invention. As shown in FIG. 1, the IG window unit includes first substrate 1 and second substrate 3 that are spaced apart from one another at least by one or more peripheral seal(s) or spacer(s) 5. Optionally, an array of spacers (not shown) may be provided between the substrates in a viewing area of the window for spacing the substrates from one another as in the context of a vacuum IG window unit. The spacer(s) 5, other spacer(s), and/or peripheral seal space the two substrates 1 and 3 apart from one another so that the substrates do not contact one another and so that a space or gap 7 is defined therebetween. The space 7 between the substrates 1, 3 may be evacuated to a pressure lower than atmospheric in certain example embodiments, and/or may be filled with a gas (e.g., Ar) in certain example embodiments. Alternatively, space 7 between the substrates 1, 3 need not be filled with a gas and/or need not be evacuated to a low pressure. In certain example embodiments, it is possible to suspend foil or other radiation reflective sheet(s) (not shown) in space 7. When substrate(s) 1 and/or 3 are of glass, each glass substrate may be of the soda-lime-silica type of glass, or any other suitable type of glass, and may be for example from about 1 to 10 mm thick in certain example embodiments of this invention.

The IG window unit of FIG. 1 may include a solar management coating 9 (e.g., low-E coating) that is supported on an interior surface of substrate 1. Solar management coating 9 includes one or more layers, although in many embodiments it is a multi-layer coating. Since one example function of solar management coating 9 is to block (i.e., reflect and/or absorb) certain amounts of IR radiation and prevent the same from reaching the building interior, the solar management coating 9 includes at least one IR blocking (i.e., IR reflecting and/or absorbing) layer. Example IR blocking layer(s) which may be present in coating 9 are of or include silver (Ag), nickel-chrome (NiCr), gold (Au), and/or any other suitable material that blocks significant amounts of IR radiation. It will be appreciated by those skilled in the art that IR blocking layer(s) of solar management coating 9 need not block all IR radiation, but only need to block significant amounts thereof. In certain embodiments, each IR blocking layer of coating 9 is provided between at least a pair of dielectric layers. Example dielectric layers include silicon nitride, titanium oxide, silicon oxynitride, tin oxide, and/or other types of metal-oxides and/or metal-nitrides. In certain embodiments, in addition to being between a pair of dielectric layers, each IR blocking layer may also be provided between a pair of contact layers of or including a material such as an oxide and/or nitride of nickel-chrome or any other suitable material. Example solar management coatings 9 which may be provided on substrate 1 are described in U.S. Pat. Nos. 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, all of which are hereby incorporated herein by reference. Of course, solar management coatings 9 herein are not limited to these particular coatings, and any other suitable solar management coatings (e.g., low-E coatings) capable of blocking amounts of IR radiation may instead be used. Solar management coatings 9 herein may be deposited on substrate(s) 1 and/or 3 in any suitable manner, including but not limited to sputtering, vapor deposition, and/or any other suitable technique.

Still referring to FIG. 1, the IG window unit further includes UV reflecting coating 10 for reflecting significant amounts of UV radiation thereby making the window more visible to birds. UV reflecting coating 10 may be, for purposes of example and without limitation, a single, multiple, or intermixed layers of titanium, vanadium, chromium, zirconium, niobium, tantalum, or tungsten combined with oxygen and/or nitrogen in order to form element variations or compounds that achieve a refractive index (n) of at least about 2.5. This increases the UV reflection of the plate glass intended for commercial, residential, and/or interior applications in order to make such windows more visible to birds thereby preventing or reducing bird collisions. The use of such coatings 10 herein enhances the performance of the glass or window by increasing the UV reflectance beyond the normal limits of raw uncoated plate glass in the 300-440 nm range of the spectrum.

In certain example embodiments, UV reflecting coating 10 may be a single layer of or including titanium oxide (e.g., $TiO_2$) which may be deposited on substrate 1 via sputtering or the like. In certain example embodiments, UV reflecting coating 10 may be a single layer of or including vanadium oxide which may be deposited on substrate 1 via sputtering or the like. Instead of titanium oxide or vanadium oxide, other materials may be used for coating 10 such as zirconium oxide, niobium oxide, tantalum oxide, tungsten oxide, and/or chromium oxide. In certain example embodiments, the coating 10 may be of or include titanium oxide (e.g., $TiO_2$) mixed with one or more of vanadium oxide, zirconium oxide, niobium oxide, tantalum oxide, tungsten oxide, and/or chromium oxide. In certain example preferred embodiments, coating 10 has a refractive index (n) of at least about 2.4, more preferably at least about 2.5. In certain example embodiments, the UV reflecting coating 10 (e.g., single layer of one or more of the material listed above) may be from about 100-1,000 angstroms thick, more preferably from about 100-600 angstroms thick, and most preferably from about 200-600 angstroms thick. These thicknesses of coating 10 have been found to provide sufficient UV reflectance to make the windows more visible to birds, while at the same time not significantly adversely affecting the aesthetics of the window.

In certain example embodiments, the high index UV reflecting coating 10 is in direct contact with the glass substrate 1, and is not part of a low-E coating. In particular, there are no IR reflecting layers (e.g., silver based, gold based, NiCr, or IR reflecting TCO-based layers) in coating 10, and there are no IR reflecting layers on the side of the substrate 1 on which the coating 10 is provided. Instead, any low-E coatings (e.g., see low-E coating 9) may be provided on another substrate 3, or may be provided on the other side of substrate 1 from coating 10.

In certain example embodiments, the UV reflecting coating 10 may block at least 15% (more preferably at least 20%, even more preferably at least 25%, and possibly at least 30%) of UV radiation in at least a substantial part of the range from 350 to 440 nm (or alternatively in a substantial part of the range from 300-400 nm), so that this does not reach the gap 7 or coating 9. This reflection of UV in this range allows the window to be more easily seen by birds, so as to reduce bird collisions with the window.

Figure 2:
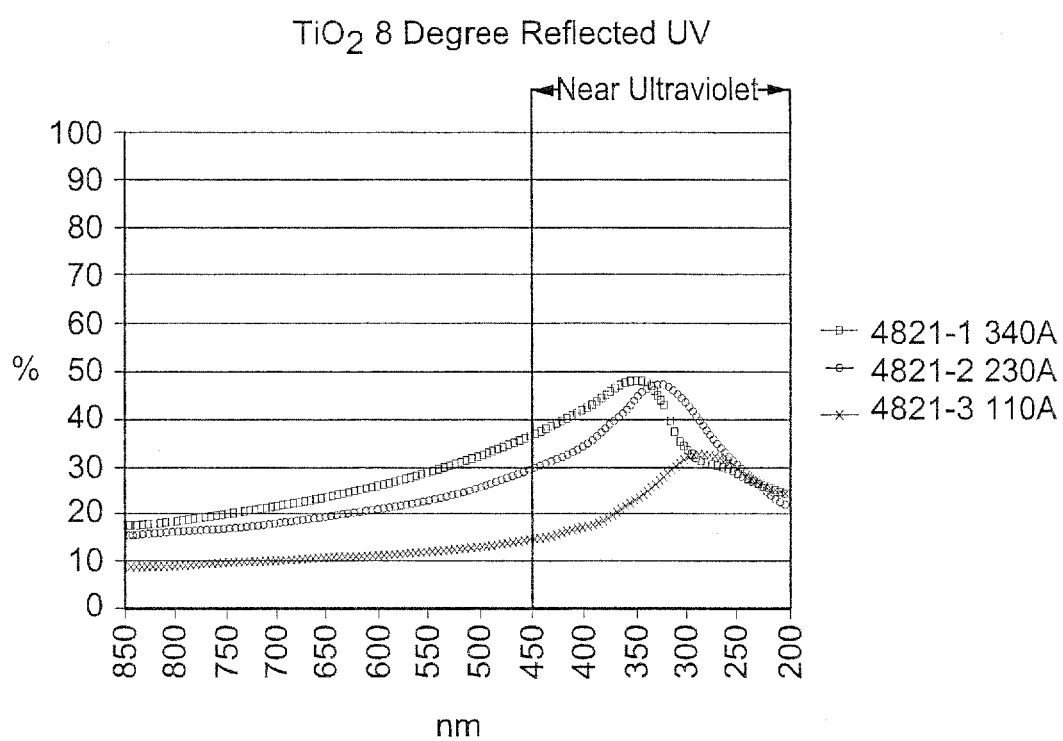
FIG. 2 is a graph illustrating percent (%) reflectance as a function of wavelength (nm), illustrating how much light at certain wavelengths (nm) is transmitted through a coated article with certain coatings provided thereon in certain example embodiments of this invention (the data of FIG. 2 was taken with a layer of DLC over the titanium oxide).

FIG. 2 is a % reflectance vs. wavelength graph illustrating how much UV is reflected by example UV reflecting coatings 10 of $TiO_2$ which are 110 angstroms, 230 angstroms, and 340 angstroms thick, respectively. It can be seen in FIG. 2 that these example coatings 10 reflect significant amounts of near-UV in the desired range, in order to make the window more visible to birds.

In certain example embodiments, the high index UV reflecting coating may be capped or covered with a protective coating 12 of a material such as diamond-like carbon (DLC) or the like in order to improve the durability of the window and protect the fragile UV reflecting coating 10. DLC layer(s) 12 is preferably partially or entirely amorphous in certain embodiments of this invention. Moreover, DLC layer(s) 12 preferably includes more $sp^3$ carbon-carbon bonds than $sp^2$ carbon-carbon bonds. In certain example embodiments, at least 40% of the carbon-carbon bonds in DLC layer(s) 12 are of the $sp^3$ type, more preferably at least about 50% of the carbon-carbon bonds in DLC layer(s) 12 are of the $sp^3$ type, and most preferably at least about 60% or 70% of the carbon-carbon bonds in DLC layer(s) 12 are of the $sp^3$ type. In certain example embodiments, the DLC layer(s) 12 has an average density of at least about 2.4 $gm/cm^3$, more preferably of at least about 2.7 $gm/cm^3$, and/or may have an average hardness of at least about 10 GPa (more preferably of at least about 20 GPa, and most preferably of at least about 30 GPa). In certain example embodiments, DLC layer(s) 12 may include other materials such as hydrogen, boron, silicon, oxygen, and/or the like. For example, DLC layer(s) 12 may include from about 5-25% hydrogen (H) in certain embodiments, more preferably from about 10-20% H. DLC layer(s) 12 may be hydrophobic (high contact angle), hydrophilic (low contact angle), or neither in different embodiments of this invention. For purposes of example only, DLC layer(s) 12 may be of or include any of the DLC inclusive layer(s) or coating systems described in any of U.S. Pat. Nos. 6,261,693, 6,277,480, 6,280,834, 6,303,225, and/or 6,284,377 (all of which are hereby incorporated herein by reference) in different embodiments of this invention. DLC layer(s) 12 may be deposited on the substrate 1 (over the UV blocking coating) via an ion beam deposition technique, or any other suitable deposition process (e.g., see the processes described in the aforesaid patents, incorporated herein by reference).

As shown in FIG. 1, 10 units typically are characterized as having four surfaces. In particular, surface #1 faces the building exterior, surface #2 is the interior coated/uncoated surface of the same substrate 1 but faces the interior space/gap 7 of the IG unit, surface #3 is the interior coated/uncoated surface of the other substrate 3 facing the interior space/gap 7, and surface #4 faces the building interior. In the FIG. 1 embodiment, UV reflecting coating 10 is provided on surface #1 and the solar control coating 9 is provided on surface #3. This is a preferred arrangement of the coatings, as it enables much IR radiation to be blocked and much UV to be reflected before reaching space 7. However, in alternative embodiments of this invention, the positions of coatings 9 and 10 may be reversed, or they may be provided on different surfaces in still further embodiments of this invention.

In view of the presence of both IR blocking coating (i.e., solar management coating) 9 and UV reflecting coating 10, IG window units according to certain example embodiments of this invention as shown in FIG. 1 may have the following solar characteristics (e.g., where the coated glass substrate 1 is a clear soda lime silica glass substrate from 2 to 3.2 mm thick, and the other soda lime silica glass substrate 3 is clear and from 2 to 3.2 mm thick). In Table 1 below, $R_gY$ is visible reflection from the outside or exterior of the window/building (i.e., from where the sun is located, and $R_fY$ is visible reflection from the interior side (e.g., from within the building interior), and the a*, b* values under these respective reflection parameters also correspond to glass (g) side (i.e., from outside the window in FIG. 1) and film (f) side (i.e., from interior the window in FIG. 1). In table 1, UV refl. stands for UV reflectance, and the higher the UV reflectance the more visible the window is to birds.

TABLE 1

IG Unit Solar Characteristics

| Characteristic | General | Preferred | More Preferred |
|---|---|---|---|
| $T_{vis}$ (or TY)(Ill. C., 2 deg.): | >=50% | >=60% | >=68% |
| a*$_g$ (Ill. C., 2°): | −10 to 10 | −5.0 to 0.0 | −3.5 to −1.5 |
| b*$_g$ (Ill. C., 2°): | −10 to 10 | −2.0 to 4.0 | 1.0 to 3.0 |
| $R_gY$ (Ill. C., 2 deg.): | 5 to 17% | 7 to 13% | 9 to 11% |
| a*$_g$ (Ill. C., 2°): | −8.0 to 8.0 | −3.0 to 2.0 | −2.0 to 0.5 |
| b*$_g$ (Ill. C., 2°): | −8.0 to 8.0 | −5.0 to 1.0 | −4.0 to −1.0 |
| $R_fY$ (Ill. C., 2 deg.): | 5 to 20% | 7 to 14% | 10 to 12% |
| a*$_f$ (Ill. C., 2°): | −8.0 to 8.0 | −3.0 to 2.0 | −1.5 to 0.5 |
| b*$_f$ (Ill. C., 2°): | −8.0 to 8.0 | −5.0 to 1.0 | −4.0 to −1.5 |
| SHGC: | <=0.50 | <=0.45 | <=0.40 |
| SC: | <=0.55 | <=0.49 | <=0.46 |
| U-value: | 0.10 to 0.40 | 0.20 to 0.30 | 0.22 to 0.25 |
| UV refl. (350-450 nm): | >=20% | >=25% | >=30% or 35% |
| UV refl. (325-375 nm): | >=25% | >=30% | >=35% or 40% |

It is noted that certain parameters can be tuned by adjusting layer thicknesses. For example, ultraviolet (UV) reflectance can be further increased by adjusting the thickness and/or materials of coating 10.

The solar management coating 9 of the FIG. 1 embodiment may be a low-E coating in certain embodiments of this invention. In certain example embodiments, after optional heat treatment (e.g., thermal tempering and/or heat bending), the coating 9 in the FIG. 1 embodiment may have a sheet resistance ($R_s$) of no greater than 8 ohms/square, more preferably no greater than 6 ohms/square, and most preferably no greater than 4 ohms/square. In certain embodiments, the coating 9 may have an emissivity ($E_n$) after heat treatment of no greater than 0.10, more preferably no greater than 0.07, and even more preferably no greater than 0.05.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An IG window unit for reducing bird collisions comprising:
   a first glass substrate;
   a second glass substrate spaced apart from the first glass substrate;
   a UV reflecting coating provided on an exterior surface of the first glass substrate so as to directly contact the exterior surface of the first glass substrate at an exterior surface of the IG window unit so as to face an exterior of a building in which the IG window unit is to be mounted;
   a low-E coating comprising at least one IR reflecting layer comprising silver located between at least first and second dielectric layers, the low-E coating being provided on an interior surface of the first glass substrate so that the low-E coating and the UV reflecting coating are located on opposite sides of the first glass substrate for reducing bird collisions;
   wherein the UV reflecting coating is located at the exterior surface of the IG window unit and has an outer surface that is exposed to atmosphere; and
   wherein the IG window unit has a visible transmission of at least about 50%, and the UV reflecting coating reflects at least 20% of UV radiation in the range of from 350-450 nm.

2. The IG window unit of claim 1, wherein the UV reflecting coating reflects at least 25% of UV radiation in the range of from 350-450 nm.

3. The IG window unit of claim 1, wherein the UV reflecting coating reflects at least 30% of UV radiation in the range of from 350-450 nm.

4. The IG window unit of claim 1, wherein the low-E coating comprises first and second IR blocking layers each comprising Ag, at least one dielectric layer provided between at least the first IR blocking layer and the first substrate, at least another dielectric layer provided between at least the first and second IR blocking layers, and wherein the low-E coating has an emissivity ($E_n$) of no greater than 0.10 and/or a sheet resistance ($R_s$) of no greater than 8 ohms/square.

5. The IG window unit of claim 1, wherein the first and second glass substrates are spaced apart from one another by at least one spacer and/or edge seal so as to define a space between the substrates.

6. The IG window unit of claim 5, wherein the space between the substrates is filled with a gas.

7. The IG window unit of claim 6, wherein the space between the substrates is at a pressure less than atmospheric.

8. A window unit for reducing bird collisions, comprising:
   a first glass substrate;
   a second glass substrate spaced apart from the first glass substrate;
   a UV reflecting coating provided on an exterior surface of the first glass substrate at an exterior surface of the window unit, the UV reflecting coating for facing an exterior of a building in which the window unit is to be mounted;
   a low-E coating comprising at least one IR reflecting layer located between at least first and second dielectric layers, the low-E coating being provided on an interior surface of the first glass substrate so that the low-E coating and the UV reflecting coating are located on opposite sides of the first glass substrate for reducing bird collisions;
   wherein the UV reflecting coating is located at the exterior surface of the window unit and comprises an oxide and/or nitride of one or more of titanium, vanadium, chromium, zirconium, niobium, tantalum, and tungsten, wherein the UV reflecting coating has an outer surface that is exposed to atmosphere; and
   wherein the IG window unit has a visible transmission of at least about 50%, and the UV reflecting coating reflects at least 20% of UV radiation in the range of from 350-450 nm.

* * * * *